Dec. 27, 1932.  C. W. ROBINSON  1,892,007
YIELDABLE DRAFT DEVICE FOR GROUND WORKING IMPLEMENTS
Filed June 11, 1931
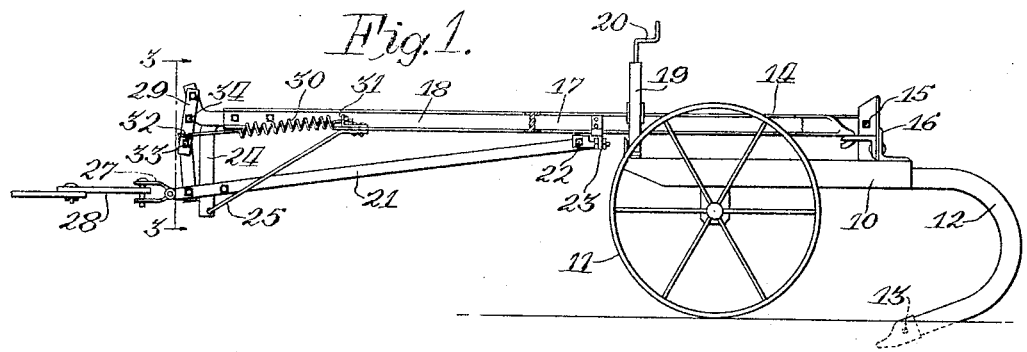
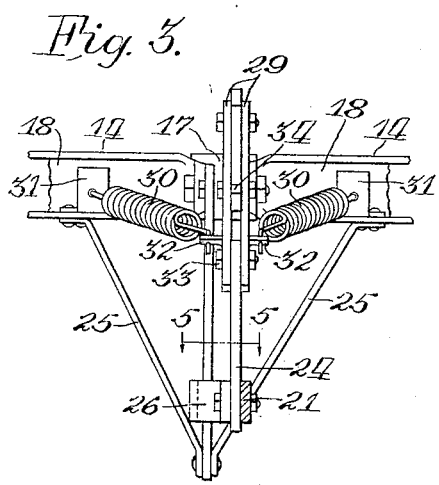
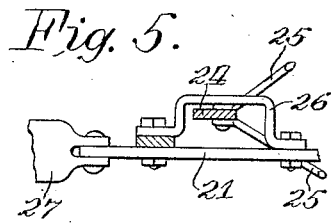
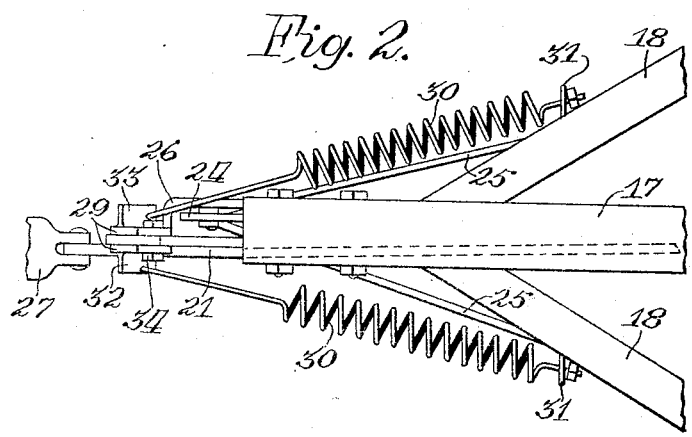
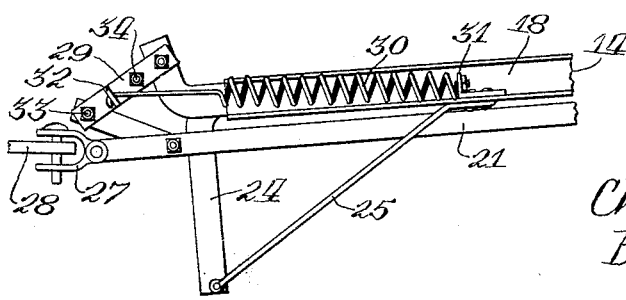
Inventor
Charles W. Robinson
By H. P. Daniels
Atty.

Patented Dec. 27, 1932

1,892,007

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

YIELDABLE DRAFT DEVICE FOR GROUND WORKING IMPLEMENTS

Application filed June 11, 1931. Serial No. 543,602.

The present invention relates to ground working implements and is particularly directed to structure designed to prevent breakage when an obstruction is struck by the soil engaging element of such an implement.

The principal object of the invention is to provide draft transmitting means for tillage implements of certain types that will permit the soil engaging tool and the frame carrying it to move out of normal working position in a manner to allow the tool to ride over an obstruction encountered during travel and then be automatically restored to normal position.

More specifically, the object of the invention is to provide a draft connection for rod weeders of existing types that will allow the implement frame to rock or tilt forwardly on its supporting wheels when the rod strikes an obstacle and automatically rock back to its original position when the obstacle is passed.

The illustrative embodiment of the invention hereinafter described, and illustrated in the accompanying drawing, accomplishes the above object and has other advantages which will become evident upon disclosure of the novel organization and details of construction in which the invention resides.

On the drawing,—

Figure 1 is a side view of a rod weeder embodying the novel draft applying means;

Figure 2 is an enlarged detail plan view of the forward portion of the machine illustrated in Figure 1;

Figure 3 is a view of the forward portion of the machine as seen on the line 3—3 of Figure 1;

Figure 4 is a detail side view of the forward portion of the machine shown in Figure 1 with the parts of the hitch shown in the positions assumed when the frame is tilted forwardly; and, Figure 5 is a detail view on the line 5—5 in Figure 3.

In the present instance the invention has been illustrated as embodied in a rod weeder comprising a lower frame 10 which is supported on end wheels 11 and carries a plurality of downwardly curved standards, one of which is shown at 12, in the lower ends of which the usual weeder rod 13 is journaled. Above the frame 10 there is a forwardly extended draft frame 14 which is pivoted at 15 to brackets 16 on the rear of the frame 10. The frame 14 preferably comprises a central member 17 (Figure 2) and diagonal members 18. For purposes of adjustment, the forward side of frame 10 is provided with an upright arched guide member 19 which embraces the central member 17 of the upper frame. The guide member 19 is adjustably connected to the central member 17 as by a threaded rod and crank 20, so that the angular relation of the frames 10 and 14 may be adjusted to vary the elevation of the rod 13. The construction so far described is well known, and it will be evident that, if the forward end of the frame 14 were directly connected to a source of power, such as a tractor, as heretofore done, there would be no opportunity for the rod 13 to move out of working position and escape injury should it strike an obstacle, such as a rock in the soil.

To obviate this disadvantage, the frame 14 has connected to it a forwardly extending draft link 21 which is pivoted to frame 14 on a transverse pivot volt 22 carried by a bracket 23 located at a rearward point on the frame 14, and preferably just back of the central transverse line of the frame, as illustrated in Figure 1. The forward end of the central member 17 of the upper frame is provided with a vertical, depending arm 24 which is braced on the diagonal members 18 by rods 25. The draft link 21 extends forwardly and downwardly and passes adjacent the vertical arm 24 and is provided there with a strap or yoke 26 enclosing said arm, as shown in Figure 5. At its forward end the link 21 is provided with the usual clevis 27 for connection with the draft bar of a tractor shown at 28.

The draft link arrangement so far described permits the connected frames 10 and 14 to rock as a unit on the wheels 11 to thereby raise and lower the rod 13, as the forward end of the upper frame member 17 will be free to move towards and from the draft link 21, as illustrated in Figures 1 and 4, due to the pivotal connection between the link 21 and the frame member 17 at 22. In order to prevent too free rocking movement and to normally hold the rod in working position, the forward end of the draft link 21 is connected to the forward end of the central frame member 17 by a connection which will break under draft overload, such as a toggle link connection 29, which is normally held in extended position by tension springs 30 anchored on lugs 31 secured to the diagonal members 18 of the upper frame 14 and also connected to ears 32 extending from the upper toggle link just above the connecting pivot bolt 33, as best seen in Figure 3. A cross pin or bolt 34 on the upper link of the toggle serves as a stop positioned to engage the front end of the member 17 to prevent exact alignment of the toggle links.

With this construction the implement will ordinarily be held in the position shown in Figure 1 with the rod engaging the soil to the depth set by the adjustable connection between the sections of the implement frame at 19 and 20. Should the rod strike a rock or similar obstacle, the rear end of the implement frame will be thrust upwardly. The yielding toggle connection between the forward end of the frame and the draft frame 21 will thereupon be caused to yield or break and the implement will rock on its wheels until the frame and draft link have attained the parallel position shown in Figure 4. After the rod has passed over the obstacle, the pull of the springs 30 will extend the toggle, thereby forcing the implement to rock back into normal position and restoring the rod to its original working position.

The structure described embodies the preferred form of the invention, but this is subject to obvious modifications without departure from the scope of the invention as defined in the following claims.

What is claimed is:

1. The combination of a horizontal implement frame, a pair of wheels on which the frame is rockably supported, a ground engaging tool carried by the frame behind said wheels, a forwardly and downwardly extending draft link connected to the frame by a transverse pivot located rearwardly on the frame, and a connection between the front end of the frame and the draft link breakable under draft overload to allow the frame to rock on its wheels.

2. The combination of a horizontal implement frame, a pair of wheels on which the frame is rockably supported, a ground engaging tool carried by the frame behind said wheels, a forwardly and downwardly extending draft link connected to the frame by a transverse pivot located rearwardly on the frame, a toggle link connection between the front end of the frame and the draft link, and means for yieldably holding the toggle in extended position.

3. The combination of a horizontal implement frame including a forwardly extending member terminating in a vertical guide arm, a pair of wheels on which the frame is rockably supported, a ground engaging tool carried on the frame back of said wheels, a forwardly extending draft link connected at its rear end to the rear portion of the frame by a transverse pivot and slidably guided at its front end on said vertical arm, a toggle link connection between the front end of the frame and the draft link, and a tension spring connecting the frame and toggle and normally holding it in extended position.

In testimony whereof I affix my signature.

CHARLES W. ROBINSON.